(12) United States Patent
Herrero et al.

(10) Patent No.: US 11,091,268 B2
(45) Date of Patent: Aug. 17, 2021

(54) VEHICLE SEAT ASSEMBLY WITH ENERGY ABSORBING FEATURE

(71) Applicant: The Boeing Company, Chicago, IL (US)

(72) Inventors: Javier Herrero, Mercer Island, WA (US); Everette Desmond Gray, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/578,777

(22) Filed: Sep. 23, 2019

(65) Prior Publication Data

US 2021/0086902 A1 Mar. 25, 2021

(51) Int. Cl.
*F16M 13/00* (2006.01)
*B64D 11/06* (2006.01)

(52) U.S. Cl.
CPC ...... *B64D 11/0619* (2014.12); *B64D 11/0696* (2013.01)

(58) Field of Classification Search
CPC .... B64D 11/0619; B64D 11/0696; B60N 2/00
See application file for complete search history.

(56) References Cited

U.S. PATENT DOCUMENTS

| 4,822,092 A * | 4/1989 | Sweers | B60N 2/015 24/662 |
|---|---|---|---|
| 7,467,763 B2 | 12/2008 | Kismarton | |
| 9,839,295 B2 * | 12/2017 | Robinson | A47C 3/00 |
| 10,150,392 B2 * | 12/2018 | Mani | B60N 2/42736 |
| 10,232,532 B1 | 3/2019 | Prebil et al. | |
| 2009/0267390 A1 * | 10/2009 | Honnorat | F16F 7/123 297/216.16 |
| 2012/0125699 A1 * | 5/2012 | Guthrie | F16F 3/023 177/225 |

OTHER PUBLICATIONS

Composites World, "Composite leaf springs: Saving weight in production", Feb. 3, 2014, pp. 1-14, retrieved on Sep. 19, 2019, retrieved from internet: https://www.compositesworld.com/articles/composite-leaf-springs-saving-weight-in-production-suspension-systems.

* cited by examiner

*Primary Examiner* — Amy J. Sterling
(74) *Attorney, Agent, or Firm* — Coats & Bennett, PLLC (57) ABSTRACT

A seat assembly that is attached to a floor of a vehicle. The seat assembly can include a seat with one or more flex beams that support the seat above the floor. The flex beams comprise a bowed shape with a curving intermediate section positioned between opposing ends. The flex beam is configured to compress when a force is applied to the seat assembly to absorb energy. The flex beam is also configured to impede the return of the flex beam to the first position after the force is removed.

28 Claims, 12 Drawing Sheets

VEHICLE SEAT ASSEMBLY WITH ENERGY ABSORBING FEATURE

TECHNOLOGICAL FIELD

The present disclosure relates generally to the field of seat assemblies and, more specifically, to seat assemblies designed to absorb energy that is applied to the seat assemblies.

BACKGROUND

A seat assembly on a vehicle accommodates a person traveling on the vehicle. This can include a variety of contexts, such as but not limited to a seat assembly on an aircraft, bus, or car for a passenger who has paid for the transportation. This can also include a seat assembly for a person controlling the vehicle, such as a pilot or driver. The seat assembly provides support and comfort to the person during their travel. The seat assembly can also provide protection for the person if the vehicle were to become involved in an event.

The seat assembly includes a seat on which the person sits and one or more legs that are attached to and support the seat above a floor of the vehicle. The seat assembly can also include other components that support the person, such as a back rest and arm rests. The seat assembly is designed to protect the person during an event in which a force is applied to the seat assembly. This can include various events, such as a sudden stop. Regulatory bodies, such as the Federal Aviation Administration, set safety requirements that are to be met in order to keep the person safe. For example, a seat assembly in an aircraft should be constructed to withstand a 16G forward and 14G vertical impact pulse load.

Some vehicles rely on other components in addition to the seat assembly to provide protection to the person. For example, a floor of a vehicle can be designed to absorb some of the energy that is applied to the seat assembly during an event. Another example is a wall of a vehicle constructed to deform and absorb a portion of the force. This allows for the seat assembly to be designed to withstand a lesser amount of force, as the overall safety requirements are met by the combination of the seat assembly and the one or more other design features. The seat assembly could be designed to meet the safety requirements without relying on other components of the vehicle.

SUMMARY

One aspect is directed to a seat assembly that is attached to a floor of a vehicle. The seat assembly comprises a seat. A frame supports the seat. A flex beam contacts the frame and comprises a bowed shape with a curving intermediate section positioned between opposing ends. The intermediate section is in contact with the frame to support the frame above the floor.

In another aspect, a lock includes a first locking member connected to the flex beam and a second locking member. The first and second locking members comprise teeth that engage together when a force is applied to the seat that moves the intermediate section of the flex beam towards the floor.

In another aspect, the first locking member is connected to the intermediate section of the flex beam and extends outward from the flex beam.

In another aspect, a handle is connected to one of the first locking member and the second locking member with the handle extending away from the lock and configured to disengage the first and second locking members.

In another aspect, a base extends between and is connected to the opposing ends of the flex beam with the base being flat to be positioned on the floor of the vehicle.

In another aspect, fasteners connect the opposing ends of the flex beam to the base.

In another aspect, damping pads are connected to the base and positioned between the opposing ends of the flex beam and the base with the damping pads constructed from a friction-inducing material that causes friction with the flex beam when the flex beam moves relative to the damping pads.

In another aspect, first and second holders are connected to the base and each comprise a floor and opposing sides that form an interior space with a first one of the damping pads and a first one of the opposing ends positioned in the first holder and a second one of the damping pads and a second one of the second opposing ends positioned in the second holder.

In another aspect, the flex beam is constructed from a thermoplastic composite.

In another aspect, the seat comprises a plurality of bases and backrests that are arranged in a row to accommodate two or more persons.

One aspect is directed to a seat assembly that is attached to a floor of a vehicle. The seat assembly comprises a seat. A frame supports the seat. A flex beam comprises first and second ends and an intermediate section with a bowed shape that supports the frame. A base is attached to the first and second ends of the flex beam. The flex beam is movable between a first position and a second position. The first position comprises the flex beam being bowed upward away from the base. The second position comprises the flex beam being positioned in closer proximity to the base.

In another aspect, a lock includes a first locking member on the flex beam and a second locking member on the base. The first and second locking members are positioned to be engaged together in the second position to prevent the flex beam from moving away from the base towards the first position.

In another aspect, the first and second locking members are spaced apart and disengaged in the first position.

In another aspect, the first and second locking members comprise one or more teeth with the teeth facing inward away from the first and second ends of the flex beam to contact together in the second position.

In another aspect, a handle is connected to a first one of the first and second locking members and extends away from a second one of the first and second locking members.

In another aspect, the lock is a first lock and further comprising a second lock spaced away from the first lock with the second lock comprising a first locking member on the flex beam and a second locking member on the base with the first and second locking members being engaged together in the second position to prevent the flex beam from moving away from the base towards the first position.

In another aspect, a first damping pad is positioned between the first end of the flex beam and the base and a second damping pad positioned between the second end of the flex beam and the base with the first and second damping pads constructed from a friction-inducing material that causes friction with the flex beam when the flex beam moves relative to the first and second damping pads.

In another aspect, a first holder is attached to a first section of the base and a second holder is attached to a second section of the base with the first damping pad and the first end of the flex beam being held in contact together by the first holder and the second damping pad and the second end of the flex beam being held in contact together by the second holder.

In another aspect, the first holder comprises a first interior space that is larger than the first end for the first end to be movable with the first interior space and the second holder comprises a second interior space that is larger than the second end for the second end to be movable with the second interior space.

In another aspect, the flex beam comprises a bowed shape in each of the first and second positions with the second position having a flatter shape than the first position.

In another aspect, the flex beam comprises a compound shape with concave sections extending inward respectively at the first and second ends and the intermediate section having a convex shape.

One aspect is directed to a method of absorbing energy that is applied to a vehicle seat. The method comprises: supporting the vehicle seat on a bowed intermediate section of a flex beam and positioning the vehicle seat a first distance above a floor of the vehicle with the flex beam having a first shape; in response to a force being applied to the vehicle seat, deflecting the intermediate section of the flex beam to a second distance above the floor that is closer than the first distance and flattening the flex beam to a second shape and absorbing at least a portion of energy that is applied to the vehicle seat; and impeding the flex beam from returning to the first shape while being deflected downward towards the floor and impeding the vehicle seat from moving away from the floor.

In another aspect, impeding the flex beam from returning to the first shape comprises engaging teeth on a first locking member with teeth on a second locking member and locking the flex beam and preventing the vehicle seat from moving away from the floor.

In another aspect, the method includes deflecting the flex beam and ratcheting the teeth on the first locking member across the teeth on the second locking member.

In another aspect, the method includes receiving a force at one of the first and second locking members while the flex beam is locked and gradually unlocking the flex beam thereby causing the flex beam to move away from the floor.

In another aspect, impeding the flex beam from returning to the first shape comprises moving each end of the flex beam across a damping pad and impeding the return of the flex beam back to the first shape.

In another aspect, the method includes moving each of the ends of the flex beam within a holder that is attached to a base.

In another aspect, the method includes moving each of the ends of the flex beam across the damping pad when deflecting the intermediate section of the flex beam.

The features, functions and advantages that have been discussed can be achieved independently in various aspects or may be combined in yet other aspects, further details of which can be seen with reference to the following description and the drawings.

DETAILED DESCRIPTION

Figure 1:
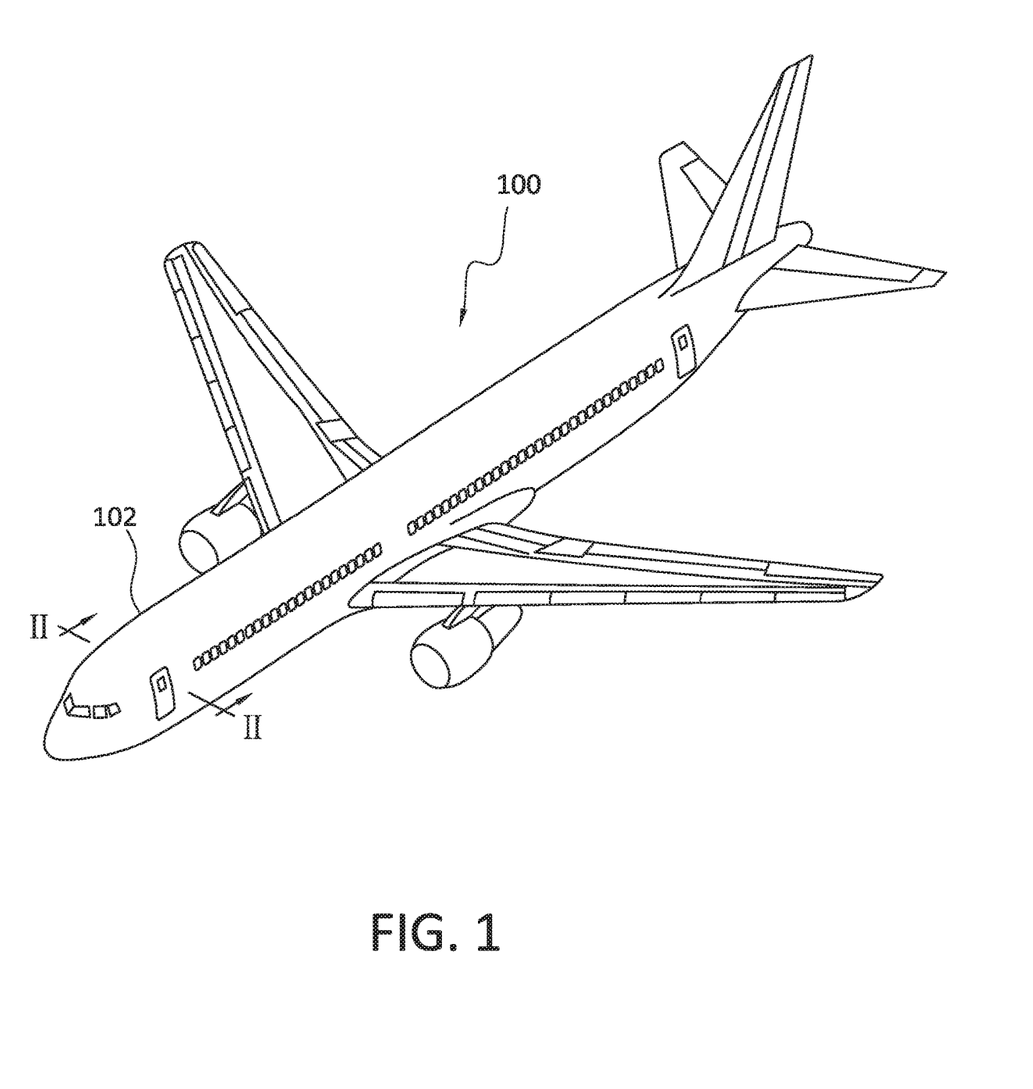
FIG. 1 is a perspective view of a vehicle that includes one or more seat assemblies for transporting persons.
Figure 2:
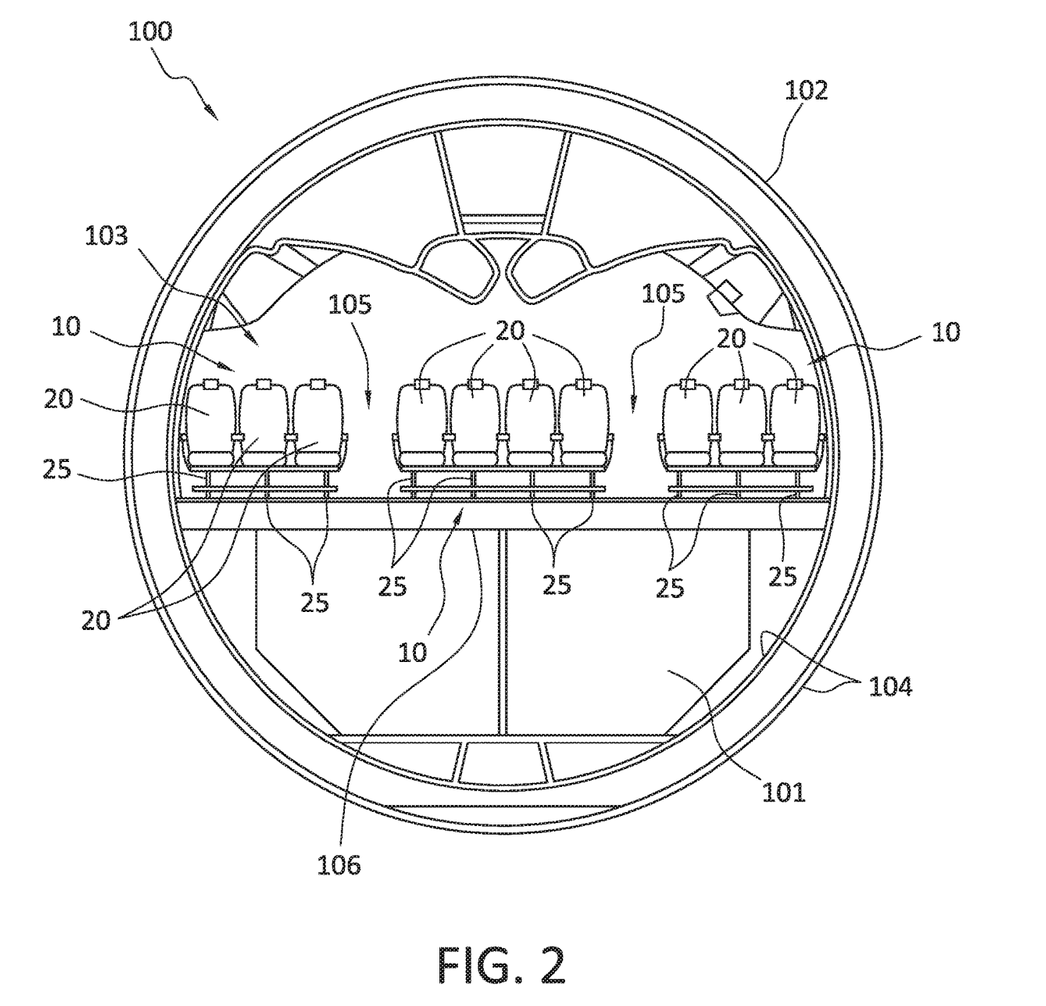
FIG. 2 is a section view cut along line II-II of FIG. 1.

FIG. 1 illustrates a vehicle 100 configured for transporting persons. FIG. 1 specifically discloses an aircraft, although it is understood that the present disclosure is applicable to a wide variety of vehicles 100. FIG. 2 is a cross-sectional, schematic view of the vehicle 100 indicated by view arrows II-II in FIG. 1. FIG. 2 illustrates a simplified version of the interior space of a fuselage 102 that includes a cabin 103 formed within the outer walls 104. The cabin 103 includes a floor 106 that separates the cabin 103 from a cargo area 101. Seat assemblies 10 are mounted to the floor 106 and positioned about the cabin 103 to accommodate persons. The number and positioning of the seat assemblies 10 can vary depending upon the vehicle 100. FIG. 2 includes a row of three separate seat assemblies 10 that are separated by aisles 105. The vehicle 100 can include various numbers of rows, and various number of seat assemblies 10 per row.

Figure 3:
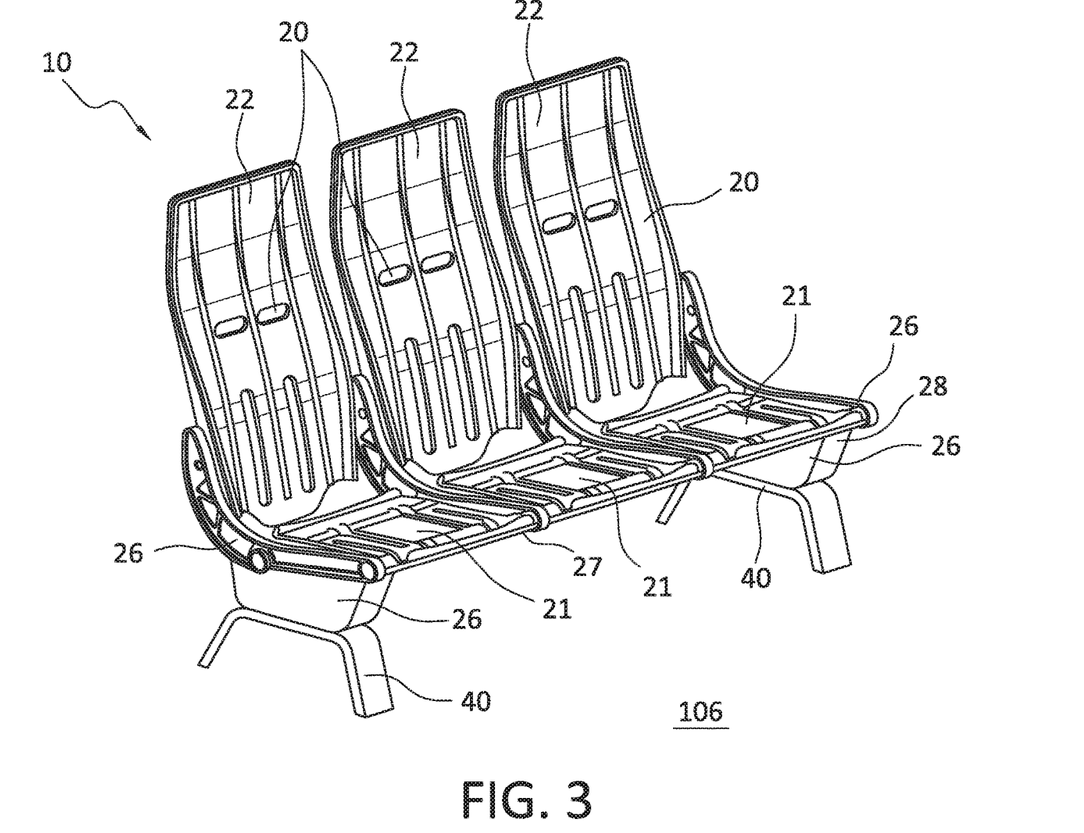
FIG. 3 is a perspective view of a seat assembly that includes a plurality of seats that are arranged in a row.

As illustrated in FIG. 3, each seat assembly 10 includes a seat 20 and a frame 26. In the example of FIG. 3, each seat 20 is configured to receive one person and includes a base 21 and a backrest 22. In another example, the seat 20 just includes a base 21. The frame 26 supports the seat 20 and can include one or more braces 27, such as a cross brace or spreader bar. The frame 26 can also include an extension 28 that extends outward from the seat 20. The seat 20 can include one or more cushions (not illustrated in FIG. 3) over one or both of the base 21 and/or backrest 22 to provide comfort to the person.

Figure 4:
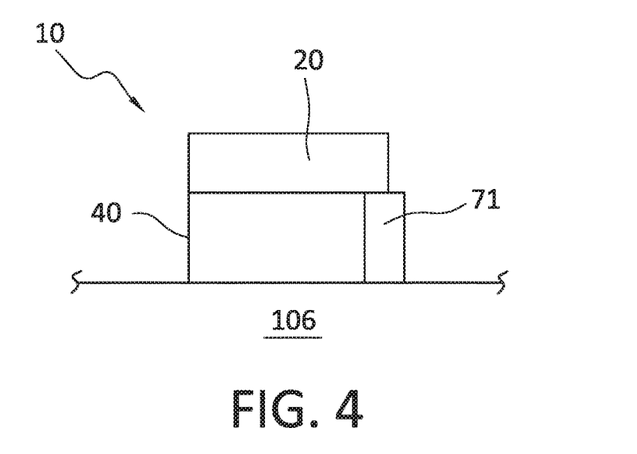
FIG. 4 is a schematic diagram of a seat assembly with a leg and a support to position the seat above the floor.

The manner in which the seat assembly 10 is support above the floor 106 can vary. In one example as illustrated in FIG. 3, the seat assembly 10 is supported by a pair of flexible beams 40. The number and positioning of the flexible beams 40 (hereinafter flex beam 40) can vary with FIG. 3 illustrating one example that includes two flex beams 40. In another example as illustrated in FIG. 4, the seat assembly 10 is supported by one or more supports 71 in addition to one or more flex beams 40. In another example, the seat assembly 10 can be supported by a wall 104 in addition to one or more flex beams 40.

Figure 5A:
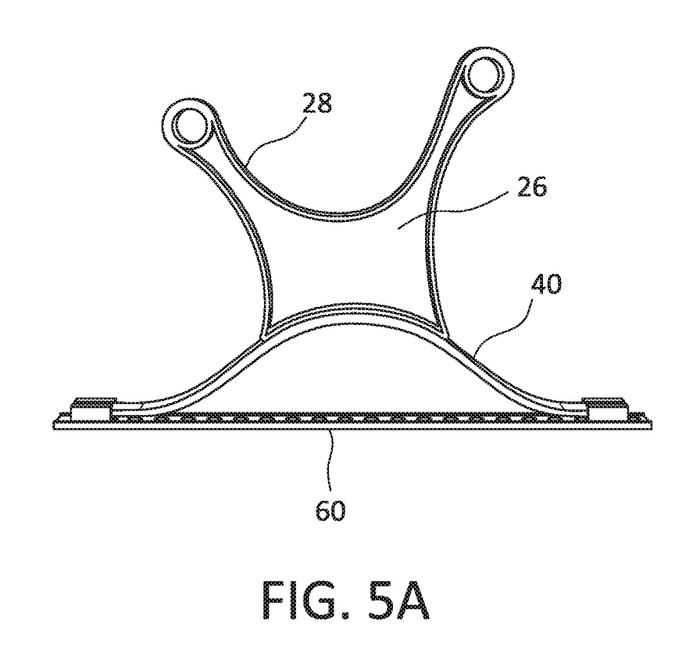
FIG. 5A is a side view of a flex beam in a first shape supporting a frame of a seat assembly.
Figure 5B:
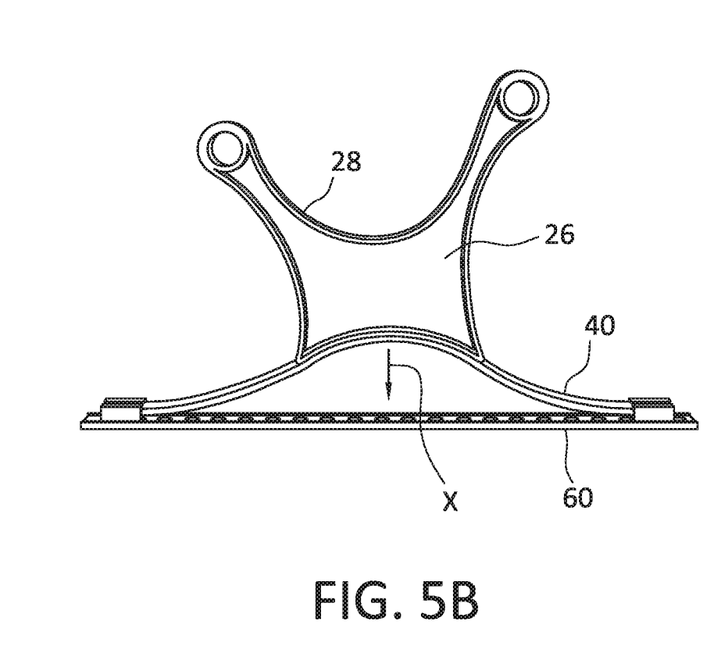
FIG. 5B is a side view of the flex beam of FIG. 5A in a second shape supporting the frame of the seat assembly.

The seat assembly 10 is constructed to absorb energy if the vehicle 100 was to be involved in an event. FIGS. 5A and 5B disclose an extension 28 of a frame 26 of a seat assembly 10 supported by a flex beam 40. Various sections of the frame 26 can contact against the flex beam 40. In one example, one or more braces 27 contact against the flex beam 40. In another example as illustrated in FIGS. 5A and 5B, one or more extensions 28 contact against the flex beam 40.

As illustrated in FIG. 5A, the flex beam 40 includes a first shape prior to the application of force due to an event involving the vehicle 100. The force causes the flex beam 40 to flex away from the first shape to dissipate the energy as illustrated in FIG. 5B. This can include a vertical displacement in the direction of arrow X with the flex beam 40 having a flatter shape. The flex beam 40 is configured to be progressively loaded to absorb the energy of the applied force.

The seat assembly 10 can be further configured to impede the return of the flex beam 40 to its first shape after the force is removed. This can include locking the flex beam 40 in the displaced orientation. This can also include slowing the return of the flex beam 40 to the first shape. This impeding of the flex beam 40 prevents a sudden spring back of the flex beam 40.

The flex beam 40 can be fixedly attached to the floor 106. Alternatively, the flex beam 40 can be movably attached to the floor 106.

Figure 6:
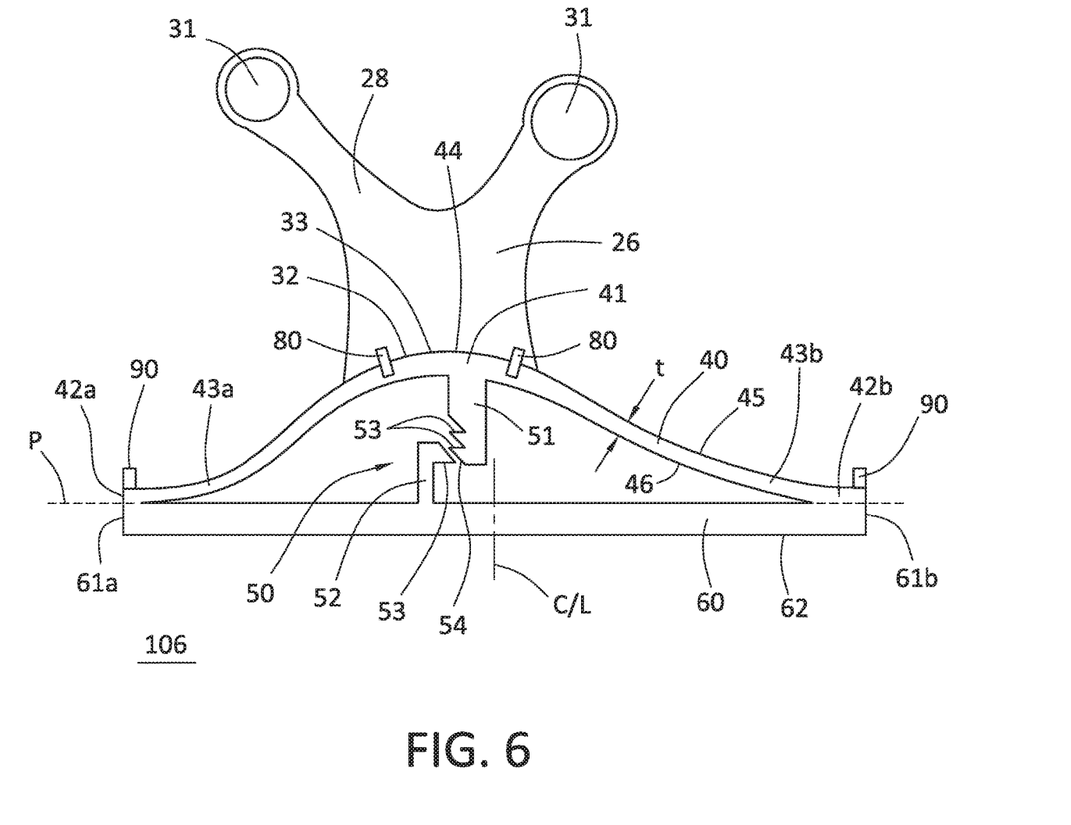
FIG. 6 is a side view of a leg in a first orientation with a flex beam having a first shape and a lock in a disengaged position.

FIG. 6 illustrates an extension 28 of a frame 26 contacting against a flex beam 40. A lock 50 is configured to impede the return of the flex beam 40 after the application of a force. A force applied to the seat assembly 10 is transferred to and deflects the flex beam 40. The lock 50 secures the flex beam 40 in the deflected position and prevents the flex beam 40 from returning the stored energy back to the seat 20.

In the example of FIG. 6, the extension 28 of the frame 26 that contacts the flex beam 40 includes one or more receptacles 31 that can attach to a brace 27 (not illustrated in FIG. 6) such as a spreader bar or cross tube. The receptacles 31 include an enclosed tube that receives the spreader bar or cross tube. In other examples, the receptacles 31 include other shapes and/or configurations. One specific example includes the receptacles 31 having an open configuration. In examples with multiple receptacles 31, the different receptacles 31 can include the same or different shapes and/or configurations. The extension 28 of the frame 26 also includes an edge 32 that faces towards the flex beam 40. In one example, the edge 32 includes a shape that matches the shape of the flex beam 40.

One or more fasteners 80 connect the extension 28 to the flex beam 40. The fasteners 80 can include an elongated shape with a first end attached to the frame 26 and an opposing second end attached to the flex beam 40. Various types of fasteners 80 can be used, including but not limited to staples, straps, and bolts. In one example, the fasteners 80 provide for relative movement between the frame 26 and the flex beam 40. The one or more fasteners 80 can also position the extension 28 with the edge 32 spaced away from the flex beam 40 to form a gap 33. In another example, the edge 32 is positioned in contact with the flex beam 40. In another example, the extension 28 and flex beam 40 have an integral, one-piece construction.

The flex beam 40 includes an elongated shape with opposing ends 42a, 42b and an intermediate section 41 therebetween. The flex beam 40 includes a length measured between the opposing ends 42a, 42b. The ends 42a, 42b are positioned along a plane P. A centerline C/L of the flex beam 40 is centered between the ends 42a, 42b (i.e., at a midpoint of the length). In one example, the centerline C/L is perpendicular to the plane P.

When viewed from the side as illustrated in FIG. 6, the flex beam 40 includes a compound shape with concave sections 43a, 43b in proximity to the ends 42a, 42b respectively, and the intermediate section 41 having an opposing convex shape. As illustrated in FIG. 6, the compound shape is asymmetrical about a centerline C/L. A peak 44 of the intermediate section 41 is positioned in closer proximity to one of the ends 42a, 42b (e.g., the peak 44 is positioned in closer proximity to end 42a in FIG. 6).

Figure 7:
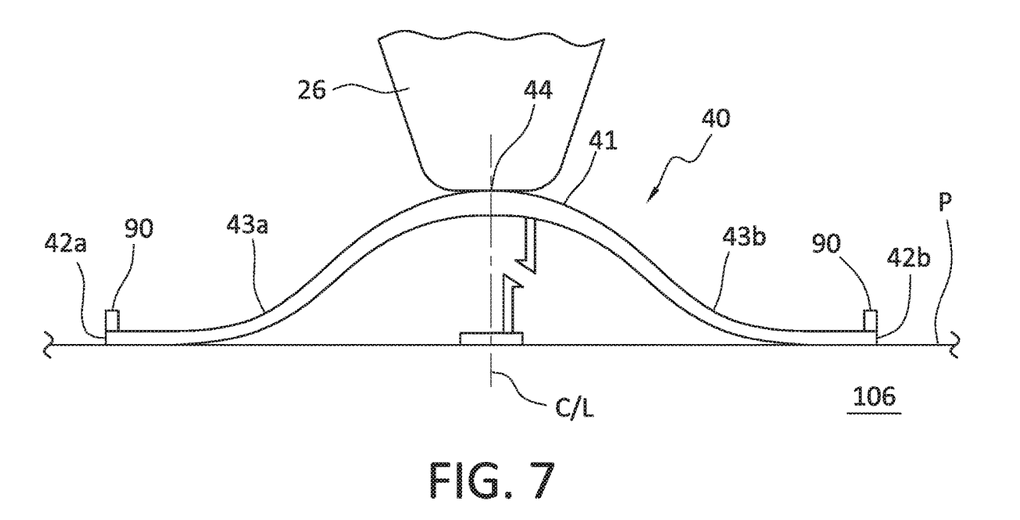
FIG. 7 is a side view of a leg in a first orientation with a lock in a disengaged position.

FIG. 7 includes a flex beam 40 with a symmetrical shape about the centerline C/L. The centerline C/L extends through the peak 44 of the intermediate section 41. The ends 42a, 42b are aligned in a plane P that is formed at a surface of the floor 106. The centerline C/L is perpendicular to the plane P.

As illustrated in FIG. 6, the flex beam 40 includes a thickness t measured between opposing surfaces 45, 46. The thickness t can be consistent along the length of the flex beam 40. In another example, the thickness t varies along the length. In one specific example, the thickness t is larger at the peak 44 of the intermediate section than at the concave sections 43a, 43b and the ends 42a, 42b.

The flex beam 40 can be secured to a base 60 as illustrated in FIG. 6. The base 60 includes an elongated shape with opposing ends 61a, 61b. The base 60 can be shaped and sized for the ends 61a, 61b to align with ends 42a, 42b of the flex beam 40 respectively. The ends 61a, 42a and ends 61b, 42b are secured together to prevent the ends 42a, 42b from moving during deflection of the flex beam 40. In one example, fasteners 90 such as screws, rivets, etc. provide for the attachment. In another example, the base 60 and flex beam 40 have an integral, one-piece construction with the base 60 and the flex beam 40 being a single piece. The base 60 can include a flat bottom to contact against the floor 106.

The flex beam 40 can also be used without a base 60 as illustrated in FIG. 7. The flex beam 40 can be attached to the floor 106 with one or more fasteners 90.

The one or more flex beams 40 can be positioned vertically below the seat 20. The one or more flex beams 40 support and position the seat 20 above the floor 106. One or more of the flex beams 40 can also be positioned at locations that are not vertically below the seat 20. In one example, one or more of the flex beams 40 are positioned on one or more lateral sides of the seat 20. This positioning absorbs energy that is applied to the seat assembly 10 in a lateral direction. This can include one or more of the flex beams 40 extending between the seat 20 and a wall 104 of the vehicle 100. In another example, one or more of the flex beams 40 are positioned between the seat 20 and a ceiling of the vehicle 100. This positioning can provide support for forces applied in this direction, such if the seat assembly 10 is used within a spacecraft.

The lock 50 secures the flex beam 40 in the deflected position. The lock 50 includes a first member 51 that extends from the flex beam 40 and a second member 52 that is positioned adjacent to the first member 51 and away from the flex beam 40. The first member 51 is positioned on the flex beam 40. In one example, the first member 51 is positioned at the peak 44 of the flex beam 40. The first member 51 can be attached to the flex beam 40 in various manners, such as but not limited to with one or more fasteners or being integrally formed with the flex beam 40.

The second member 52 can be attached to or integral with the base 60 as illustrated in FIG. 6. The second member 52 can also be a separate component that is attached to the floor 106 as illustrated in FIG. 7.

The first and second members 51, 52 can be substantially parallel to one another. This positioning provides for engagement together during deflection of the flex beam 40. In one example, the first and second members 51, 52 are each aligned perpendicular to the base 60 when the flex beam 40 is in the first position.

Figure 8:
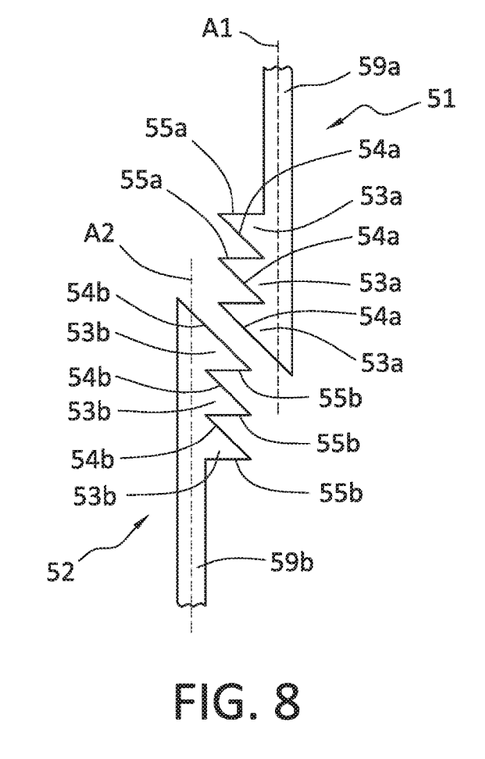
FIG. 8 is a side view of first and second members of a lock is a disengaged position with each including teeth.

The first and second members 51, 52 each include one or more teeth 53. As illustrated in FIG. 8, the teeth 53 include a base 59a, 59b respectively. The base 59a includes a longitudinal axis A1 and base 59b includes a longitudinal axis A2. The teeth 53a, 53b include first sides 54a, 54b that are angled at acute angles relative to the respective longitudinal axes A1, A2. This positioning causes the teeth 53a, 53b to slide across each other during deflection of the flex beam 40. The teeth 53 also include second sides 55a, 55b that have different angles relative to the respective axes A1, A2 to engage together and prevent the flex beam 40 from returning to the original shape. The first and second members 51, 52 can include the same or different numbers and/or shapes of teeth 53.

In the example as illustrated in FIG. 6, the first and second members 51, 52 are spaced apart and the teeth 53 are not engaged when the flex beam 40 is in the first orientation prior to the event. In another example, the first and second members 51, 52 can be engaged in the first orientation. In this example, the first and second members 51, 52 are configured to provide for movement of the flex beam 40 and additional engagement of the teeth 53 during the event.

Figure 9:
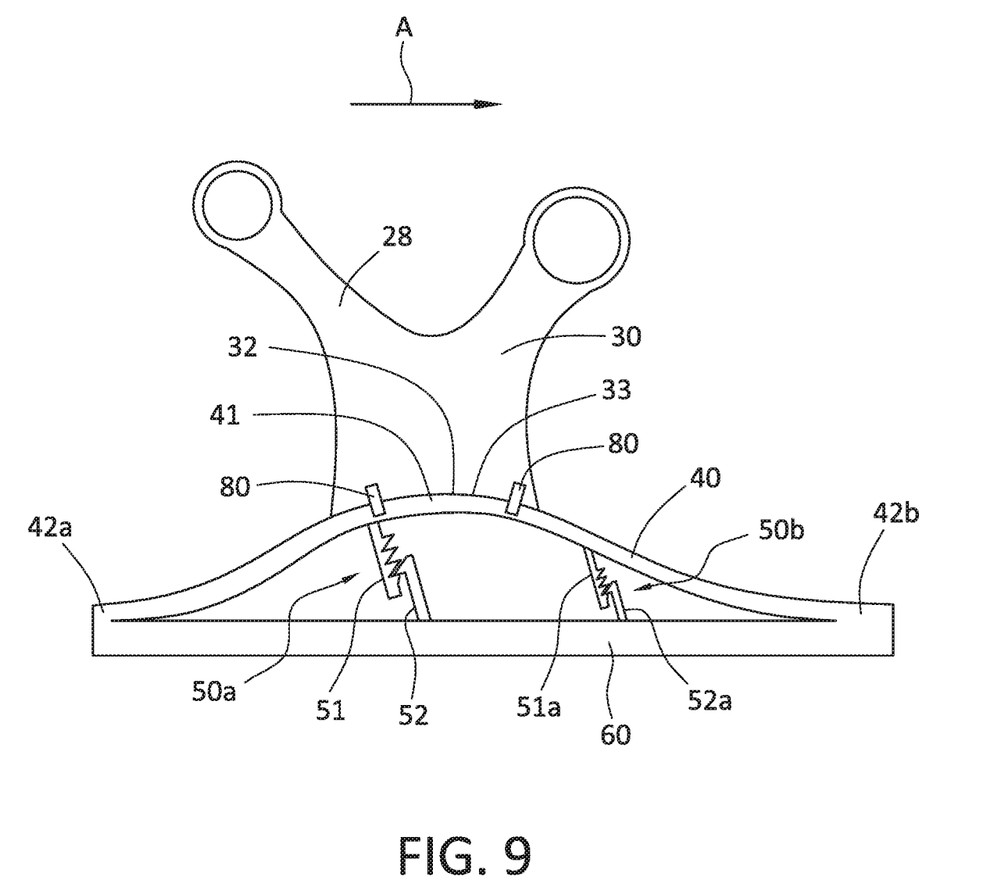
FIG. 9 is a side view of a leg of a seat assembly that includes a pair of locks.

The seat assembly 10 can include two or more locks 50. FIG. 9 includes a first lock 50a and a second lock 50b. The locks 50 can be positioned along the same section of the flex beam 40, or can be positioned along different sections.

The locks 50 can be positioned at different orientations. In one example, the locks 50 are aligned perpendicular to the base 60. Other examples include different orientations with a variety of different angular positions. FIG. 9 illustrates a seat assembly 10 with each of the locks 50a, 50b positioned at non-perpendicular angles relative to the base 60. In multiple lock configurations, the different locks 50 can have the same or different orientations. In one example, one or more of the locks 50 are aligned to trap energy of an impact motion having an acceleration A. This acceleration may be referred to as forward acceleration as it relates to the vehicle 100. In one example, the acceleration A is parallel to the base 60.

One or more of the frame 26, flex beam 40, lock 50, and base 60 can be constructed from a variety of materials. One example includes being constructed from a thermoplastic composite. The use of thermoplastic composites provides for savings in weight and manufacturing costs over traditional metal legs. In one example, the use of thermoplastic composites provides for a 40% reduction in weight and a 30% cost savings over traditional components constructed from titanium. The use of thermoplastic composites also eliminates the reliance on the limited number of metal suppliers.

The one or more leg components can be constructed from the same or different thermoplastic composites. The thermoplastic composite materials are constructed in plies that include thermoplastic matrix polymers such as polyetheretherketone ("PEEK"), polyetherketoneketone ("PEKK"), polyphenylsulfone ("PPS"), polyetherimide ("PEI") preferably reinforced with a fibrous component such as glass (s-type or e-type) or carbon fiber. The fibers within each ply can be oriented in a unidirectional or non-uniform arrangement, depending upon the particular application.

The use of the flex beam 40 facilitates the use of thermoplastic composites. Thermoplastic composites, unlike metals, do not have energy absorption capability. Thus, the thermoplastic composites can shatter and may not adequately absorb the energy. The flex beam 40 deflects thus absorbing the applied energy and preventing the need for the energy to be absorbed by the thermoplastic composite itself.

In another example, one or more of the components including the frame 26, flex beam 40, lock 50, and base 60 are constructed from materials other than thermoplastic composites. Examples include but are not limited to titanium, aluminum, and steel. The flex beams 40 deflect in a similar manner and the one or more components can also undergo plastic deformation to further absorb the energy.

Figure 10:
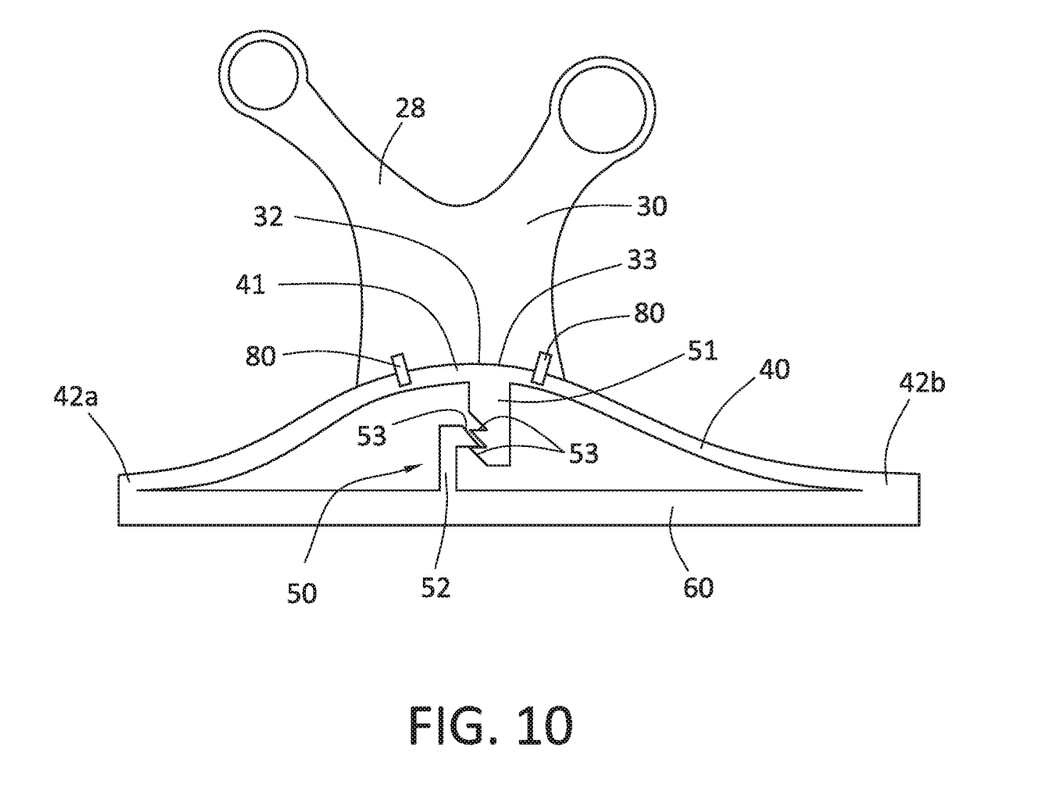
FIG. 10 is a side view of the leg of FIG. 5 in a second orientation with the flex beam having a second flatter shape and the lock in an engaged position.

FIGS. 6 and 10 illustrate the movement of the flex beam 40 during the application of a force applied to the seat assembly 10. In one example, the movement occurs when the vehicle 100 is involved in an event, such as a sudden stop. As illustrated in FIG. 6, the flex beam 40 is in a first orientation with the flex beam 40 having a first shape with the peak 44 positioned a first distance away from the base 60. The flex beam 40 supports the seat 20 (not illustrated in FIGS. 6 and 10) a first distance above the floor 106 in the first orientation. The flex beam 40 can be in the first orientation during normal operation of the vehicle 100 (i.e., prior to the event).

When a load is applied to the seat assembly 10 as illustrated in FIG. 10, the flex beam 40 deflects towards the base 60 to a second orientation. This deflection absorbs the energy that is applied to the seat assembly 10 thus protecting a person in the seat assembly 10. The deflection of the flex beam 40 causes the teeth 53 of the first and second members 51, 52 to move past each other. The teeth 53 are configured for the first sides 54 to contact and slide past one another as the flex beam 40 deflects. The teeth 53 have a ratcheting movement as the first sides 54 slide past each other and the first and second members 51, 52 rebound inward during the movement. The shapes of the second sides 55 prevent the flex beam 40 from moving back to the first orientation. This prevents the energy stored in the flex beam 40 from being returned back to the person.

The number of teeth 53 can vary on the first and second members 51, 52. FIGS. 6 and 10 include two teeth 53 on the first member 51 that can ratchet against a single tooth 53 on the second member 52. Other examples can include multiple teeth 53 on each member 51, 52 such that two or more teeth 53 are engaged in the second orientation.

Figure 11:
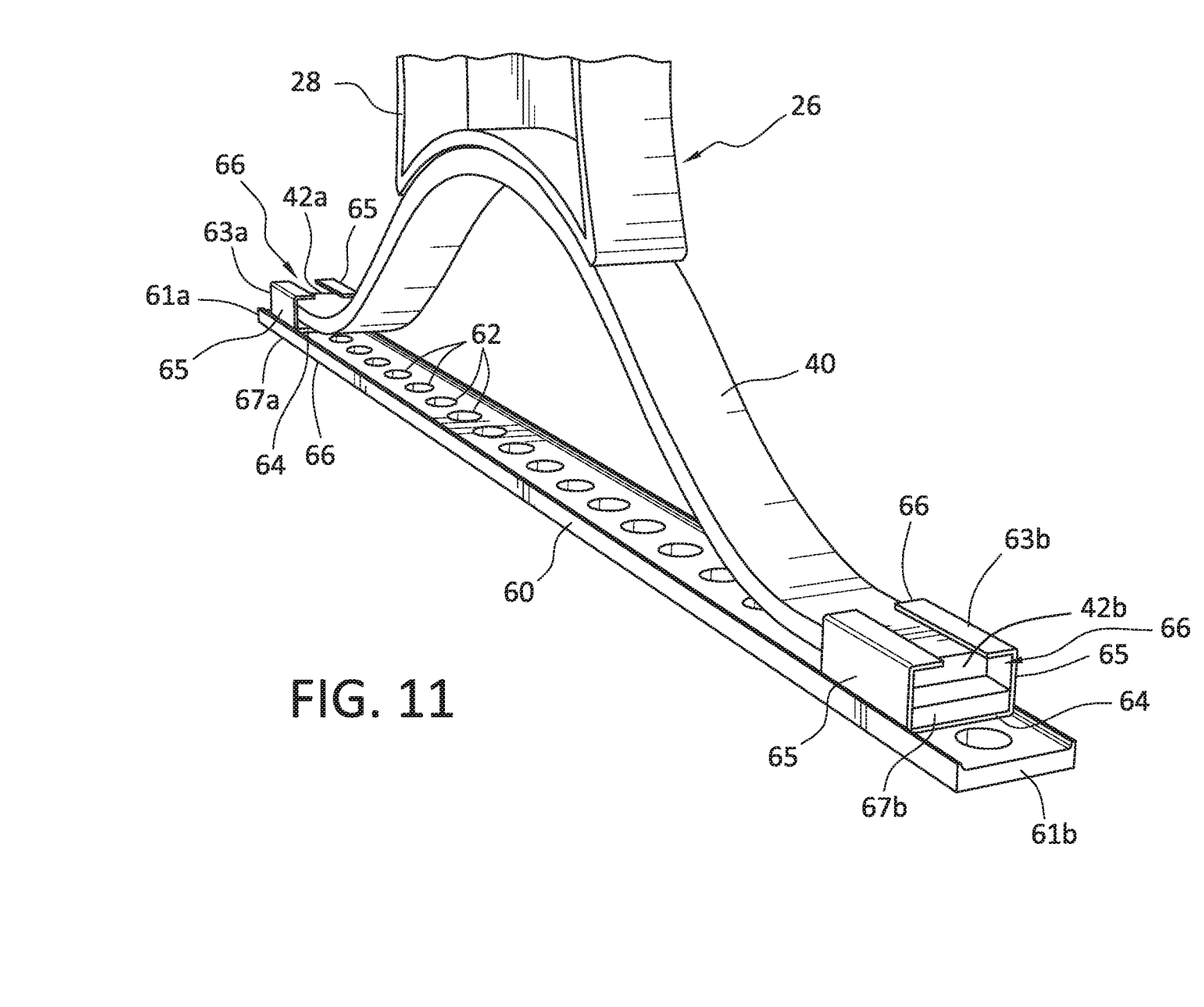
FIG. 11 is a perspective view of a flex beam positioned in holders that each include a damping pad.

FIG. 11 illustrates a flex beam 40 configured to deflect to absorb energy that is applied to the seat assembly 10. The base 60 includes holders 63a, 63b that are each configured to receive an end 42a, 42b respectively of the flex beam 40. The base 60 includes apertures 62 each sized to receive a fastener to secure the holders 63a, 63b to the desired location along the length. Each holder 63a, 63b includes a floor 64 and opposing sides 65. One or more of the ends 66 are open to receive the ends 42 of the flex beam 40. Each holder 63a, 63b is sized to allow for relative movement of the flex beam 40.

The holders 63a, 63b include a damping pad 67a, 67b respectively positioned on the floor 64. The damping pads 67a, 67b can be fixedly attached to the floor 64, such as by one or more of an adhesive or mechanical fastener. Each of the damping pads 67a, 67b supports and contacts against one of the ends 42a, 42b of the flex beam 40. Damping pads 67a, 67b are constructed from a friction-inducing material that causes friction with the flex beam 40 when the flex beam 40 slides across the damping pad 67a, 67b. Materials include but are not limited to metal, ceramic, and carbon fiber impregnated polymerics. In one example, the damping pad 67 constructed from a rigid material. The damping pads 67a, 67b can be constructed from the same or different materials.

During an event in which a force is applied to the seat assembly 10, the flex beam 40 moves through the holders 63a, 63b in a first direction. After the event, the friction between the flex beam 40 and the damping pads 67a, 67b slows the return of the flex beam 40 to its first shape. This manages the dissipation of energy and prevents a sudden return of the energy to the seat assembly 10 and to persons on the seat assembly 10.

Figure 12:
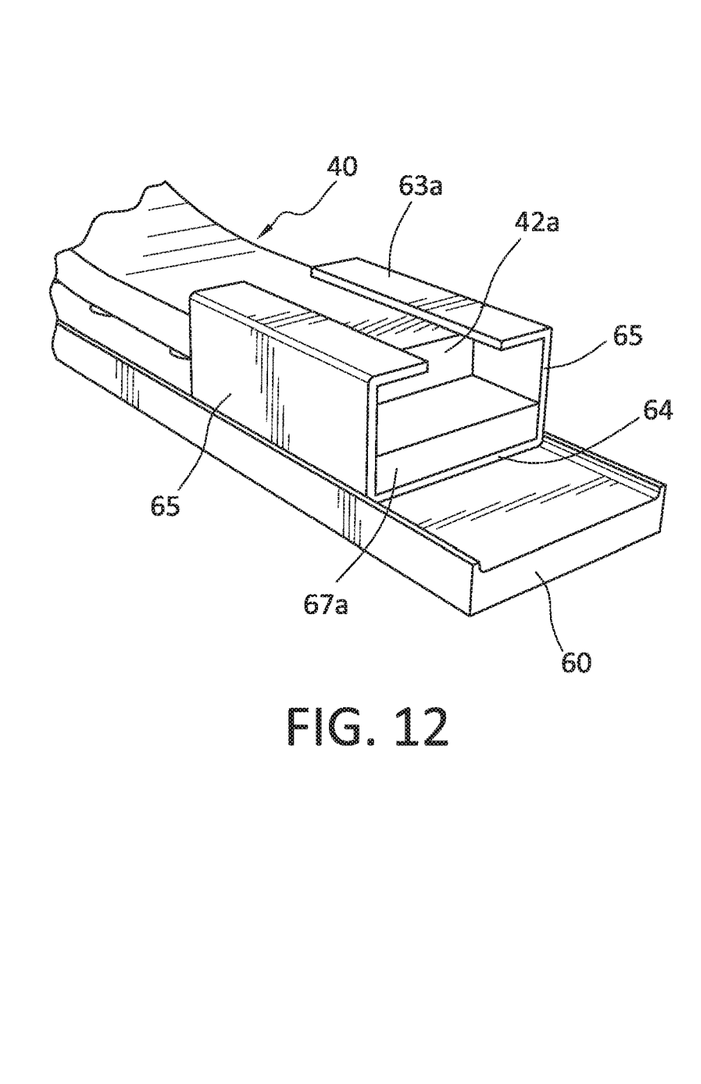
FIG. 12 is a perspective view of an end of a flex beam in a first position contacting against a damping pad.
Figure 13:
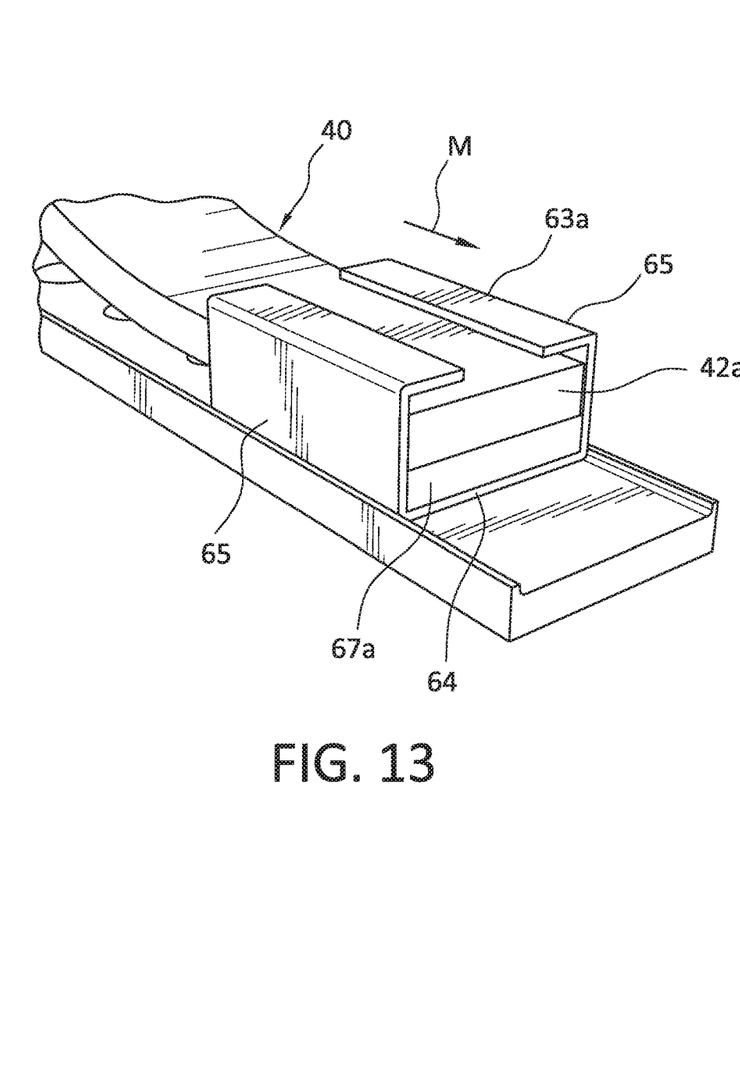
FIG. 13 is a perspective view of the end of the flex beam of FIG. 12 in a second position contacting against the damping pad.

FIGS. 12 and 13 illustrate movement of one end 42a of the flex beam 40 during an event in which a force is applied to the seat assembly 10. FIG. 12 illustrates the flex beam 40 positioned relative to the holder 63a prior to the event. The end 42a of the flex beam 40 is positioned at a first position along the damping pad 67a and within the holder 63a. As illustrated in FIG. 13, a force is applied to the seat assembly 10 causing the flex beam 40 to compress. This causes the flex beam 40 to slide across the damping pad 67a in the direction of arrow M. The first end 42a moves within the holder 63a to a second position that is located away from the first position. The extent of movement depends upon the extent of the force that is applied to the seat assembly 10. The compression of the flex beam 40 and the friction caused by the flex beam 40 moving across the damping pads 67a absorbs the energy that is applied to the seat assembly 10.

After the event, the flex beam 40 returns to the first shape. The friction between the damping pad 67a and the flex beam 40 slows the return to the first shape. This dissipates the energy and prevents a sharp return of the energy to the seat assembly 10 and one or more persons.

The damping of the flex beam 40 occurs during movement of the flex beam 40 across the damping pads 67. The amount of damping is a function of the total surface area engaged between the flex beam 40 and the damping pads 67. When the seat assembly 10 is occupied, the flex beam 40 deflects resulting in a first amount of surface area contact. This initial contact can provide for an initial pre-load state. During an event, the amount of compression of the flex beam 40 increases thus increasing the amount of surface area contact and damping. After the event, the return of the flex beam 40 to the uncompressed form is slowed by the relative movement between the flex beam 40 and damping pads 67a, 67b.

In one example, each end 42a, 42b is movably positioned in a respective holder 63a, 63b. The flex beam 40 slides along damping pads 67a, 67b. In another example, just a single end 42a is movably positioned in a holder 63a. The other end 42b is fixedly attached to the base 60 or the floor 106.

Figure 14:
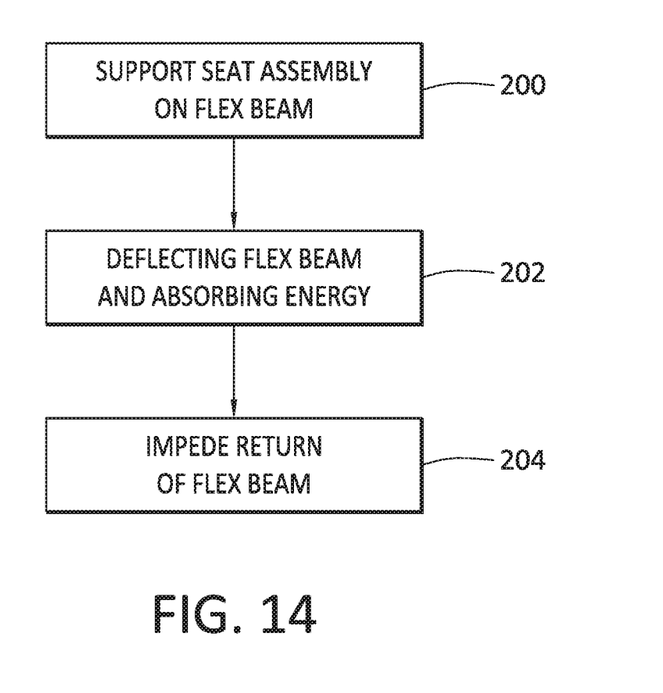
FIG. 14 is a flowchart diagram of a method of absorbing energy that is applied to a seat assembly of a vehicle.

FIG. 14 illustrates a method of absorbing energy that is applied to a vehicle seat assembly 10. The seat assembly 10 is initially supported on a bowed intermediate section 41 of a flex beam 40 prior to the vehicle 100 being involved in an event (block 200). This positions a seat 20 of the seat assembly 10 a first distance above a floor 106 of the vehicle 100. The height of the frame 26 and flex beam 40 can be determined to provide comfort to the one or more persons sitting in the seat assembly 10.

At some time thereafter, a force is applied to the seat assembly 10. This can occur if the vehicle 100 is involved in an event, such as a sudden stop. In response to the force being applied to the seat assembly 10, the flex beam 40 deflects downward towards the floor 106 thereby flattening the flex beam 40 and absorbing at least a portion of the force (block 202). After the event, the flex beam 40 is impeded from returning in an unobstructed manner back to the first shape (block 204). The impeding can include providing friction with one or more damping pads 67 and/or locking the flex beam 40 with one or more locks 50.

One or more damping pads 67 can impeding the return of the flex beam 40. As explained above, the movement of the flex beam 40 across the one or more damping pads 67 provides friction that hinders the return of the flex beam 40 to the uncompressed first shape. In one example, a single damping pad 67 contacts against the flex beam 40. In another example, two or more damping pads 67 contact against the flex beam 40. In examples with multiple damping pads 67, the damping pads 67 can have the same or different construction.

Another manner of impeding the flex beam 40 is to lock the position. During the deflection when the force is applied to the seat assembly 10, the teeth 53 on the first and second members 51, 52 move past one another. The amount of movement depends upon the size of the flex beam 40 and first and second members 51, 52, and the amount of force that is applied to the seat assembly 10. The flex beam 40 is locked in the deflected position. Locking the flex beam 40 prevents its return to the first orientation and prevents the energy stored in the flex beam 40 from being returned to the one or more persons sitting in the seat assembly 10.

Figure 15:
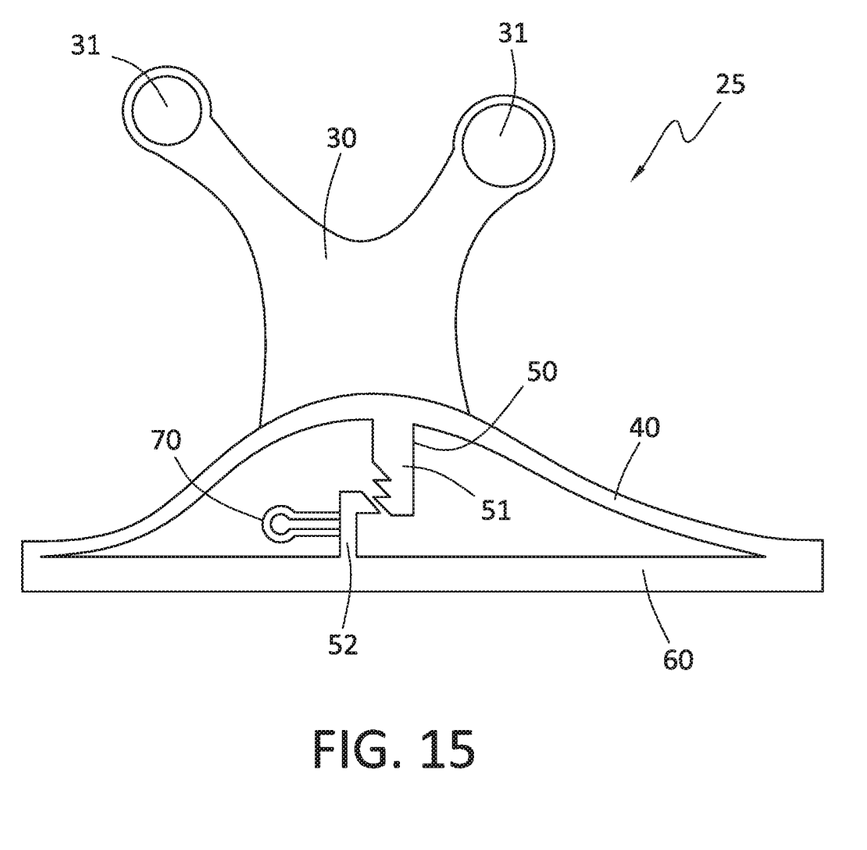
FIG. 15 is a side view of a leg in a first orientation with a lock that includes a handle.

As illustrated in FIG. 15, a handle 70 provides for applying a force to unlock the lock 50. The handle 70 is attached to one of the first and second members 51, 52 of the lock 50. The handle 70 is sized and shaped to be grasped by a person to apply a force to the first or second member 51, 52 to which it is attached. The force disengages the teeth 53 and allows for the flex beam 40 to rebound towards the first orientation.

The amount of force applied to the handle 70 can vary to control the release of the lock 50. In one example, the force separates the first and second members 51, 52 causing the flex beam 40 to fully return towards the first orientation. In another example, a more limited force is applied to separate the first and second members 51, 52 and allow for gradual separation. In one example, the force provides for the first and second members 51, 52 to separate tooth-by-tooth.

The handle 70 is positioned to be accessible to grasp and apply the force. In one example, the handle 70 is positioned under the base 21 of the seat 20 to be accessible from an aisle 105 of the vehicle 100.

The handle 70 is used after the vehicle 100 has experienced an event causing the flex beam 40 to lock in the second orientation. The person sitting in the seat assembly 10 or another person can reach under the base 21 and grasp the handle 70. The force is applied to the handle 70 thus separating the first and second members 51, 52 and releasing the lock 50.

The seat assembly 10 can be used in a variety of different vehicles 100. One example of a vehicle 100 is a commercial aircraft used for transporting persons and/or cargo as illustrated in FIG. 1. Other vehicles 100 include but are not limited to spacecraft, rotorcraft, satellites, rockets, terrestrial aircraft, water borne aircraft, buses, cars, trucks, sub-surface water borne aircraft, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A seat assembly that is attached to a floor of a vehicle, the seat assembly comprising:
a seat;
a frame that supports the seat;
a flex beam that contacts the frame, the flex beam comprising a bowed shape with a curving intermediate section positioned between opposing ends, the intermediate section being in contact with the frame to support the frame above the floor and connected to the frame at one or more points along the intermediate section; and
a lock attached to the intermediate section of the flex beam to lock the flex beam in a deflected position after application of a force on the seat.

2. The seat assembly of claim 1, wherein the lock comprises a first locking member connected to the flex beam and a second locking member, the first and second locking members comprising teeth that engage together when a force is applied to the seat that moves the intermediate section of the flex beam towards the floor.

3. The seat assembly of claim 2, wherein the first locking member is connected to the intermediate section of the flex beam and extends outward from the flex beam.

4. The seat assembly of claim 2, further comprising a handle connected to one of the first locking member and the second locking member, the handle extending away from the lock and configured to disengage the first and second locking members.

5. The seat assembly of claim 1, further comprising a base that extends between and is connected to the opposing ends of the flex beam, the base being flat to be positioned on the floor of the vehicle.

6. The seat assembly of claim 5, further comprising fasteners that connect the opposing ends of the flex beam to the base.

7. The seat assembly of claim 5, further comprising damping pads that are connected to the base and positioned between the opposing ends of the flex beam and the base, the damping pads constructed from a friction-inducing material that causes friction with the flex beam when the flex beam moves relative to the damping pads.

8. The seat assembly of claim 7, further comprising first and second holders that are connected to the base and that each comprise a floor and opposing sides that form an interior space, a first one of the damping pads and a first one of the opposing ends positioned in the first holder and a second one of the damping pads and a second one of the opposing ends positioned in the second holder.

9. The seat assembly of claim 1, wherein the flex beam is constructed from a thermoplastic composite.

10. The seat assembly of claim 1, wherein the seat comprises a plurality of bases and backrests that are arranged in a row to accommodate two or more persons.

11. A seat assembly that is attached to a floor of a vehicle, the seat assembly comprising:
a seat;
a frame that supports the seat;
a flex beam comprising first and second ends and an intermediate section with a bowed shape that supports the frame;
a base that is attached to the first and second ends of the flex beam;
the flex beam is movable between a first position and a second position;
the first position comprising the flex beam being bowed upward away from the base;
the second position comprising the flex beam being positioned in closer proximity to the base; and
a lock that extends from the flex beam and secures the flex beam in the second position.

12. The seat assembly of claim 11, wherein the lock comprises a first locking member on the flex beam and a second locking member on the base, the first and second locking members being positioned to be engaged together in the second position to prevent the flex beam from moving away from the base towards the first position.

13. The seat assembly of claim 12, wherein the first and second locking members are spaced apart and disengaged in the first position.

14. The seat assembly of claim 12, wherein the first and second locking members comprise one or more teeth with the teeth facing inward away from the first and second ends of the flex beam to contact together in the second position.

15. The seat assembly of claim 12, further comprising a handle connected to a first one of the first and second locking members and extending away from a second one of the first and second locking members.

16. The seat assembly of claim 12, wherein the lock is a first lock and further comprising a second lock spaced away from the first lock, the second lock comprising a first locking member on the flex beam and a second locking member on the base with the first and second locking members being engaged together in the second position to prevent the flex beam from moving away from the base towards the first position.

17. The seat assembly of claim 11, further comprising a first damping pad positioned between the first end of the flex beam and the base and a second damping pad positioned between the second end of the flex beam and the base, the first and second damping pads constructed from a friction-inducing material that causes friction with the flex beam when the flex beam moves relative to the first and second damping pads.

18. The seat assembly of claim 17, further comprising a first holder attached to a first section of the base and a second holder attached to a second section of the base, the first damping pad and the first end of the flex beam being held in contact together by the first holder and the second damping pad and the second end of the flex beam being held in contact together by the second holder.

19. The seat assembly of claim 18, wherein the first holder comprises a first interior space that is larger than the first end for the first end to be movable with the first interior space and the second holder comprises a second interior space that is larger than the second end for the second end to be movable with the second interior space.

20. The seat assembly of claim 11, wherein the flex beam comprises a bowed shape in each of the first and second positions with the second position having a flatter shape than the first position.

21. The seat assembly of claim 11, wherein the flex beam comprises a compound shape with concave sections extending inward respectively at the first and second ends and the intermediate section having a convex shape.

22. A method of absorbing energy that is applied to a vehicle seat, the method comprising:

supporting the vehicle seat and a frame that supports the seat on a bowed intermediate section of a flex beam and positioning the vehicle seat a first distance above a floor of the vehicle with the flex beam having a first shape with a bowed shape with the intermediate section positioned between opposing ends and the intermediate section contacting the frame to support the frame above the floor and connected to the frame at one or more points along the intermediate section;

in response to a force being applied to the vehicle seat, deflecting the intermediate section of the flex beam to a second distance above the floor that is closer than the first distance and flattening the flex beam to a second shape and absorbing at least a portion of energy that is applied to the vehicle seat; and engaging a lock that is attached to the intermediate section of the flex beam and impeding the flex beam from returning to the first shape while being deflected downward towards the floor and impeding the vehicle seat from moving away from the floor.

23. The method of claim 22, wherein impeding the flex beam from returning to the first shape comprises engaging teeth on a first locking member with teeth on a second locking member and locking the flex beam and preventing the vehicle seat from moving away from the floor.

24. The method of claim 23, further comprising deflecting the flex beam and ratcheting the teeth on the first locking member across the teeth on the second locking member.

25. The method of claim 23, further comprising receiving a force at one of the first and second locking members while the flex beam is locked and gradually unlocking the flex beam thereby causing the flex beam to move away from the floor.

26. The method of claim 22, wherein impeding the flex beam from returning to the first shape comprises moving each end of the flex beam across a damping pad and impeding the return of the flex beam back to the first shape.

27. The method of claim 26, further comprising moving each of the ends of the flex beam within a holder that is attached to a base.

28. The method of claim 26, further comprising moving each of the ends of the flex beam across the damping pad when deflecting the intermediate section of the flex beam.

* * * * *